United States Patent
Cardona et al.

(10) Patent No.: US 12,058,046 B2
(45) Date of Patent: Aug. 6, 2024

(54) COMPUTER DEVICE INCLUDING NESTED NETWORK INTERFACE CONTROLLER SWITCHES

(71) Applicant: Microsoft Technology Licensing, LLC, Redmond, WA (US)

(72) Inventors: Omar Cardona, Redmond, WA (US); Gerardo Diaz-Cuellar, Redmond, WA (US); Dinesh Kumar Govindasamy, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/628,085

(22) PCT Filed: Aug. 25, 2020

(86) PCT No.: PCT/US2020/047842
§ 371 (c)(1),
(2) Date: Jan. 18, 2022

(87) PCT Pub. No.: WO2021/041440
PCT Pub. Date: Mar. 4, 2021

(65) Prior Publication Data
US 2022/0272039 A1 Aug. 25, 2022

(30) Foreign Application Priority Data
Aug. 26, 2019 (LU) ........................................ 101361

(51) Int. Cl.
*H04L 45/76* (2022.01)
*G06F 9/455* (2018.01)
(Continued)

(52) U.S. Cl.
CPC .......... *H04L 45/76* (2022.05); *G06F 9/45558* (2013.01); *H04L 45/38* (2013.01);
(Continued)

(58) Field of Classification Search
CPC ....... H04L 45/76; H04L 45/38; H04L 45/566; G06F 9/45558; G06F 2009/45583;
(Continued)

(56) References Cited

U.S. PATENT DOCUMENTS 9,176,767 B2 11/2015 Cantu
9,979,639 B2 5/2018 Sunavala et al.
(Continued)

OTHER PUBLICATIONS

International Search Report and Written Opinion issued in International Patent Application No. PCT/US2020/047842 on Mar. 25, 2021.
(Continued)

*Primary Examiner* — Emmanuel L Moise
*Assistant Examiner* — Berhanu Shitayewoldetadik
(74) *Attorney, Agent, or Firm* — Newport IP, LLC; Jacob P. Rohwer

(57) ABSTRACT

Examples described herein generally relate to hosting kernel isolated containers within a virtual machine. A server includes a physical processor and a physical computer memory storing executable code, the executable code providing a host virtual machine including a kernel and at least one kernel isolated container within the host virtual machine. The server includes a physical network interface controller, NIC, including a first physical NIC switch and a second physical NIC switch. The first physical NIC switch is configured to distribute incoming data packets to a first plurality of functions including a physical function and virtual functions. At least one of the virtual functions is assigned to the host virtual machine. The second physical
(Continued)

NIC switch is configured to distribute the incoming data packets for the host virtual machine to a second plurality of virtual functions including a respective virtual function assigned to an individual kernel isolated container.

20 Claims, 6 Drawing Sheets

(51) Int. Cl.
  *G06F 15/16* (2006.01)
  *H04L 12/721* (2013.01)
  *H04L 12/725* (2013.01)
  *H04L 15/16* (2006.01)
  *H04L 45/00* (2022.01)

(52) U.S. Cl.
  CPC .. *H04L 45/566* (2013.01); *G06F 2009/45583* (2013.01); *G06F 2009/45595* (2013.01)

(58) Field of Classification Search
  CPC ........... G06F 2009/45595; G06F 9/455; G06F 2009/45587
  USPC ...................................................... 709/238
  See application file for complete search history.

(56) References Cited

U.S. PATENT DOCUMENTS

| | | | |
|---|---|---|---|
| 10,228,981 B2 | 3/2019 | Kakaiya et al. | |
| 11,301,278 B2* | 4/2022 | Jiang | H04L 49/70 |
| 2004/0098506 A1* | 5/2004 | Jean | H04L 61/25 709/206 |
| 2008/0222290 A1* | 9/2008 | Le Moigne | H04L 63/101 709/226 |
| 2008/0240142 A1* | 10/2008 | Belgaied | H04L 49/9063 370/420 |
| 2010/0105379 A1* | 4/2010 | Bonner | H04W 4/16 455/433 |
| 2010/0162241 A1* | 6/2010 | Koma | H04L 61/5061 718/1 |
| 2010/0223613 A1 | 9/2010 | Schneider | |
| 2011/0153909 A1 | 6/2011 | Dong | |
| 2012/0002535 A1* | 1/2012 | Droux | H04L 45/245 370/216 |
| 2012/0005521 A1* | 1/2012 | Droux | H04L 41/0668 718/1 |
| 2013/0124702 A1* | 5/2013 | Shah | G06F 16/23 707/705 |
| 2013/0254766 A1* | 9/2013 | Zuo | H04L 49/70 718/1 |
| 2014/0055470 A1* | 2/2014 | Diard | G06F 13/10 345/520 |
| 2014/0063028 A1* | 3/2014 | Diard | G06T 1/20 345/520 |
| 2015/0071301 A1* | 3/2015 | Dalal | H04L 69/22 370/474 |
| 2015/0131671 A1* | 5/2015 | Nakao | H04L 49/25 370/401 |
| 2015/0200853 A1* | 7/2015 | Kothari | H04L 45/7453 370/392 |
| 2015/0263970 A1* | 9/2015 | Macchiano | H04L 49/70 709/223 |
| 2015/0263974 A1* | 9/2015 | Jain | H04L 47/36 370/229 |
| 2015/0263991 A1* | 9/2015 | Macchiano | H04L 45/245 370/400 |
| 2015/0277953 A1* | 10/2015 | Xu | H04L 67/10 718/1 |
| 2015/0309839 A1* | 10/2015 | Lu | G06F 9/5077 718/1 |
| 2016/0036732 A1* | 2/2016 | Lu | H04L 69/30 370/235 |
| 2016/0212202 A1* | 7/2016 | Birkestrand | H04L 67/1008 |
| 2016/0342437 A1 | 11/2016 | Khemani et al. | |
| 2016/0350151 A1 | 12/2016 | Zou et al. | |
| 2017/0126726 A1* | 5/2017 | Han | H04L 63/145 |
| 2017/0170990 A1 | 6/2017 | Gaddehosur et al. | |
| 2017/0171298 A1* | 6/2017 | Jambur Sathyanarayana | H04L 67/10 |
| 2017/0295033 A1* | 10/2017 | Cherian | G06F 9/45558 |
| 2018/0152540 A1* | 5/2018 | Niell | G06F 9/5044 |
| 2018/0234516 A1* | 8/2018 | Daly | H04L 69/324 |
| 2018/0359215 A1* | 12/2018 | Khare | H04L 49/70 |
| 2019/0026154 A1* | 1/2019 | Desai | G06F 9/4856 |
| 2019/0042326 A1* | 2/2019 | Chilikin | G06F 9/45558 |
| 2019/0042741 A1* | 2/2019 | Abodunrin | G06F 13/4068 |
| 2019/0044828 A1* | 2/2019 | Gasparakis | H04L 41/5003 |
| 2019/0044866 A1* | 2/2019 | Chilikin | H04L 69/22 |
| 2019/0087214 A1 | 3/2019 | To et al. | |
| 2019/0109714 A1* | 4/2019 | Clark | H04L 67/565 |
| 2019/0319896 A1* | 10/2019 | Guo | H04L 49/252 |
| 2019/0332408 A1* | 10/2019 | Jiang | H04L 69/22 |
| 2020/0073692 A1* | 3/2020 | Rao | H04L 12/4633 |
| 2020/0218685 A1* | 7/2020 | Lu | G06F 12/1081 |
| 2022/0334864 A1* | 10/2022 | K N | G06F 8/61 |

OTHER PUBLICATIONS

Caulfield, et al., "Beyond SmartNICs: Towards a Fully Programmable Cloud", In Proceedings of IEEE 19th International Conference on High Performance Switching and Routing (HPSR), Jun. 18, 2018, 6 Pages.

Cooley, et al., "Isolation Modes", Retrieved From: https://docs.microsoft.com/en-us/virtualization/windowscontainers/manage-containers/hyperv-container, Oct. 22, 2021, 5 Pages.

Firestone, Daniel, "VFP: A Virtual Switch Platform for Host SDN in the Public Cloud", In Proceedings of the 14th USENIX Symposium on Networked Systems Design and Implementation, Mar. 27, 2017, pp. 315-328.

Hudek, Ted, "Overview of Single Root I/O Virtualization (SR-IOV)", Retrieved From: https://docs.microsoft.com/en-us/windows-hardware/drivers/network/overview-of-single-root-i-o-virtualization--sr-iov-, Apr. 20, 2017, 1 Page.

Viviano, et al., "Receive Side Scaling Version 2 (RSSv2)", Retrieved From: https://docs.microsoft.com/en-us/windows-hardware/drivers/network/receive-side-scaling-version-2-rssv2-, Dec. 15, 2021, 6 Pages.

MacMichael, Duncan, "Virtual Machine Queue (VMQ)", Retrieved From: https://docs.microsoft.com/en-us/windows-hardware/drivers/network/virtual-machine-queue--vmq-, Apr. 20, 2017, 1 Page.

Lohr, et al., "About Windows containers", Retrieved From: https://web.archive.org/web/20190528230404/https://docs.microsoft.com/en-us/virtualization/windowscontainers/about/, May 22, 2019, 8 Pages.

"Search Report Issued in Luxembourg Patent Application No. LU101361", Mailed Date: May 15, 2020, 10 Pages.

MacMichael, et al., "RSS Hashing Types", Retrieved From: https://docs.microsoft.com/en-us/windows-hardware/drivers/network/rss-hashing-types, Apr. 20, 2017, 6 Pages.

Poggemeyer, et al., "What's new in Hyper-V on Windows Server", Retrieved From: https://docs.microsoft.com/en-us/windows-server/virtualization/hyper-v/what-s-new-in-hyper-v-on-windows, Sep. 21, 2017, 8 Pages.

"International Search Report and Written Opinion Issued in PCT Application No. PCT/US20/047842", Mailed Date: Oct. 27, 2020, 15 pages.

Boeuf, Sebastien, "Kata Containers: The Way to Run Virtualized Containers", Retrieved From: https://www.openstack.org/summit/vancouver-2018/summit-schedule/events/20708/kata-containers-the-way-to-run-virtualized-containers, May 21, 2018, 3 Pages.

"Notice of Allowance Issued in European Patent Application No. 20768437.4", Mailed Date: May 24, 2023, 8 Pages.

"Notice of Allowance Issued in European Patent Application No. 20768437.4", Mailed Date: Oct. 26, 2023, 2 Pages.

\* cited by examiner

COMPUTER DEVICE INCLUDING NESTED NETWORK INTERFACE CONTROLLER SWITCHES

This application is a 35 U.S.C. § 371 National Phase of PCT Application No. PCT/US2020/047842, titled "COMPUTER DEVICE INCLUDING NESTED NETWORK INTERFACE CONTROLLER SWITCHES," filed on Aug. 25, 2020, which claims priority to Luxembourg Application No. LU101361, titled "COMPUTER DEVICE INCLUDING NESTED NETWORK INTERFACE CONTROLLER SWITCHES," filed Aug. 26, 2019, both of which are assigned to the assignee hereof, and incorporated herein by reference in their entirety.

BACKGROUND

The present disclosure relates to computer virtualization, and more particularly to nested containers within a virtualized server.

Cloud services provide virtual machines (VMs) for customers to execute various applications. The virtual machines execute on a hardware server. Multiple virtual machines can execute on the same hardware server. Containers are used to isolate different processes. Virtualization of the computer hardware allows efficient use of resources such as physical processors and physical memory. That is, resources are assigned to processes as needed and are shared between different processes.

A virtual machine adds overhead at lower layer (e.g., layer 1 and layer 2) packet routing. Because multiple addressable processes are executing on the same physical machine, each in a separate container, a virtual machine uses a software switching mechanism (e.g., a virtual switch) to route packets to specific containers. A virtual switch, however, consumes processor cycles and reduces the processor cycles available for executing the processes within the containers and also contributes to latency.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a server for hosting kernel isolated containers within a virtual machine. The server includes at least one physical processor. The server includes at least one physical computer memory storing executable code for execution by the at least one physical processor. The executable code provides a host virtual machine including a kernel and at least one kernel isolated container within the host virtual machine. The server includes a physical network interface controller, NIC, including a first physical NIC switch configured to distribute incoming data packets to a first plurality of functions. The first plurality of functions includes a physical function and virtual functions. At least one of the virtual functions assigned to the host virtual machine. The physical NIC further includes a second physical NIC switch configured to distribute the incoming data packets for the host virtual machine to a second plurality of virtual functions. A respective virtual function of the second plurality of virtual functions is assigned to an individual kernel isolated container of the at least one kernel isolated container within the host virtual machine.

In another example, the disclosure provides a method of hosting kernel isolated containers within a virtual machine. The method includes instantiating, on a server, a host virtual machine including a kernel and at least one kernel isolated container within the host virtual machine. The method includes distributing incoming data packets to a first plurality of functions via a physical network interface controller, NIC, including a first physical NIC switch, wherein the first plurality of functions includes a physical function and virtual functions, and wherein at least one of the virtual functions is assigned to the host virtual machine. The method includes distributing the incoming data packets for the host virtual machine via a second physical NIC switch included in the physical NIC, to a second plurality of virtual functions, wherein a respective virtual function of the second plurality of virtual functions is assigned to an individual kernel isolated container.

In another example, the disclosure provides a non-transitory computer-readable medium storing computer executable instructions for performing the above method.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for providing hardware level performance for process isolated containers executing on a virtual machine. The process isolated containers are guest processes that operate on a host system (e.g., a server) for providing cloud services, web services, hardware as a service, or other network virtualization services. That is, the host system includes physical computing hardware including one or more physical processors and physical memory that is configured to execute guest processes. In an implementation, the guest processes are controlled by customers of the host system provider.

Hardware virtualization allows a host system to support multiple guest processes. The guest processes are isolated using containers. A container is a virtualization of a machine. A relatively simple process isolated container is a process on the host system that is associated with a host virtual NIC (vNIC). Network isolation for the process isolated container is provided by assigning a dedicated Host vNIC to the process isolated container. The isolation can be augmented with compartments defining transport control protocol/internet protocol (TCPIP) settings (e.g., in a TCPIP.sys file). A virtual switch distributes data packets among multiple containers.

The use of a virtual switch adds a layer of overhead to the guest processes executing on the host system. Since the virtual switch is executed by the same processing resources that could otherwise execute the guest processes, the virtual switch consumes processing resources of the guest process. The virtual switch also contributes to network latency as packets are switched both by a physical NIC and the virtual switch.

In an aspect of the present disclosure, a server includes a physical network interface controller (NIC) that includes a first physical NIC switch configured to distribute incoming data packets to a plurality of functions including a physical function and virtual functions. At least one of the virtual functions is assigned to a virtual machine. The NIC also includes a second physical NIC switch configured to distribute packets for the virtual machine to a second plurality of virtual functions, each of which is associated with a kernel isolated container. As such, the NIC performs hardware switching and controls to deliver hardware level access to individual kernel isolated containers. The NIC bypasses a virtual switch of the virtual machine, thereby reducing latency and improving network speed.

Figure 1:
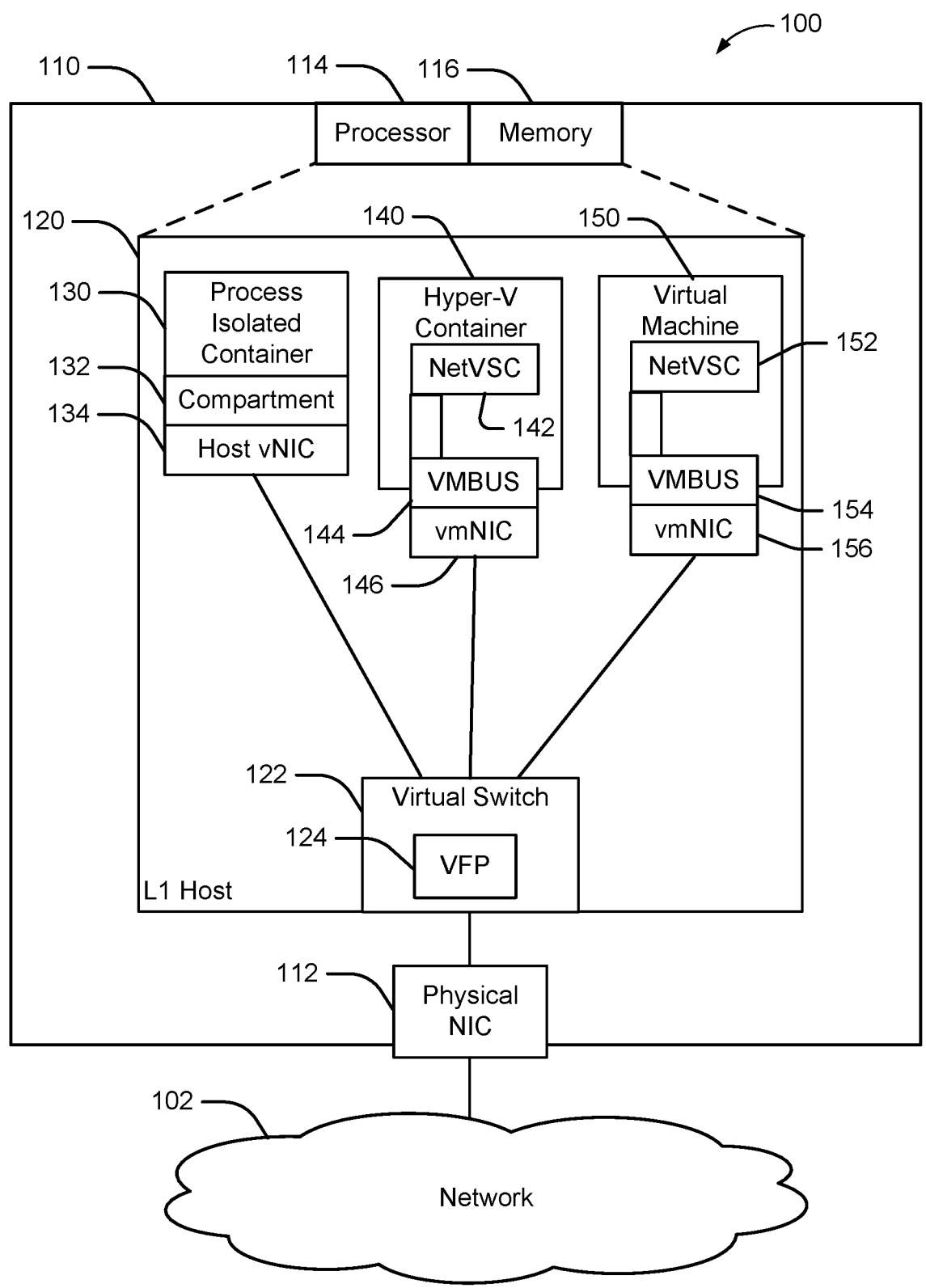
FIG. 1 is a schematic diagram of an example network architecture including containers.

Referring now to FIG. 1, an example host environment 100 includes a layer 1 host 120 executed on a physical host 110. The physical host 110 is connected to a network 102 (e.g., the Internet) via a physical NIC 112. The physical host 110 includes at least one physical processor 114 and a physical memory 116. The physical processor 114 and the physical memory 116 can be considered computing resources, which are shared among multiple containers.

The physical host 110 includes, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of hosting a guest process.

The physical host 110 includes at least one physical processor 114 that executes instructions stored in memory 116. For example, the physical processor 114 executes one or more of an L1 host 120, which is an operating system for a virtualized device. That is, the L1 host 120 controls the processor 114 and memory 116, or a portion thereof. The physical NIC 112 routes network traffic to the L1 host 120.

Memory 116 is configured for storing data and/or computer-executable instructions defining and/or associated with the L1 host 120 and/or containers such as process isolated containers 130, kernel isolated containers 140, and virtual machines 150. Physical processor 114 executes the L1 host, the containers and/or applications within the containers. Memory 116 represents one or more hardware memory devices accessible to physical host 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 stores local versions of applications being executed by physical processor 114. In an implementation, the memory 116 includes a storage device, which includes a non-volatile memory.

The physical processor 114 includes one or more processors for executing instructions. An example of physical processor 114 can include, but is not limited to, any processor specially programmed as described herein, including a controller, microcontroller, application specific integrated circuit (ASIC), field programmable gate array (FPGA), system on chip (SoC), or other programmable logic or state machine. In an example implementation, the physical processor 114 includes other processing components such as an arithmetic logic unit (ALU), registers, and a control unit. The physical processor 114 can include multiple cores and is able to process different sets of instructions and/or data concurrently using the multiple cores to execute multiple threads.

In an aspect, the L1 host 120 configures one or more containers for hosting guest processes. A container includes application code and operating system elements necessary for the application code. An example guest process is a website provided by an application within a container. The L1 host 120 hosts multiple containers. For example, the containers include process isolated containers 130, kernel isolated containers 140, and virtual machines 150. The L1 host 120 includes a virtual switch 122 for routing network traffic to individual containers. The virtual switch 122 includes instructions executed by the physical processor 114 that simulate a physical switch. That is, the virtual switch 122 distributes network traffic among the containers, for example, based on packet headers. The virtual switch 122 includes a virtual filter platform (VFP) 124. The VFP 124 applies policies and access control lists (ACLs) of the L2 host 120 to the network traffic. For example, the VFP 124 provides firewalling or control over what traffic is allowed to traverse the virtual switch 122. The VFP 124 also provides rate limiting to control how much network traffic is allowed to traverse the virtual switch 122. The VFP 124 enforces per tenant resource caps for the containers.

A process isolated container 130 provides application isolation through process and namespace isolation. A process isolated container 130 shares a kernel with the container host (e.g., L2 host 120) and all containers running on the host. A process isolated container 130 does not provide a hostile security boundary. Accordingly, the process isolated container 130 is suitable for trusted applications, but is not recommended to isolate untrusted code. Because of the shared kernel space, process isolated containers 130 require the same kernel version and configuration. Network access for a process isolated container 130 is provided by a host vNIC 134. The host vNIC 134 receives network traffic from the virtual switch 122. The process isolated container 130 can also include a compartment 132 to provide TCPIP.sys isolation. Example process isolated containers include Windows Server containers and Linux containers (e.g., Kata containers).

A kernel isolated container 140 includes its own copy of an operating system kernel and has memory assigned directly to the kernel isolated container 140. A hypervisor provides CPU, memory and IO isolation (e.g., network and storage) for the kernel isolated container 140. Kernel isolated containers are also referred to as hypervisor isolated containers. Network access for the kernel isolated container 140 is provided by a virtual machine NIC (vmNIC) 146, a virtual machine bus (vmBUS) 144, and a network virtual service client device (netVSC device) 142. An example kernel isolated container 140 is be a Hyper-V container.

A virtual machine 150 does not exactly meet the definition of a container in that a virtual machine 150 includes a complete operating system. In terms of network access, however, a virtual machine 150 also receives network access via a vmNIC 156, a vmBUS 154, and a netVSC device 152 provided by a hypervisor. Accordingly, from a networking perspective, a virtual machine is similar to a kernel isolated container. An example virtual machine is a VMware virtual machine.

The host environment 100 provides advantages over hosting a guest application on a dedicated server. In particular, the host environment 100 allows multiple applications to be executed on the same physical hardware. The applications are isolated by the containers such that each application acts as if the application is the only application on the hardware. Further, because the applications are isolated within containers, the applications are portable between physical hardware. Additionally, the containers provide easy scalability by instantiating additional containers as needed.

The host environment 100, however, may experience various performance issues compared to a dedicated hardware server. For example, routing network traffic via the virtual switch 122 consumes resources of the physical processor 114 that could otherwise be used for the applications within the containers. Additionally, the routing via the virtual switch 122 is an additional hop for the network traffic adding latency. In an aspect, where the physical processor 114 is operating with few idle cycles (e.g., 70% busy), the virtual switch contributes to a long tail latency, where some packets wait for the virtual switch 122. Additionally, various hardware accelerations, direct memory access operations, and device memory-mapped input-output operations that are available on a dedicated server are not available within a container via a virtual switch.

One technique that can improve network latency in a virtualized network is input-output virtualization (IOV) Virtual Functions (VFs) or single root (SR) IOV. SR-IOV is an extension to the PCI Express (PCIe) specification that allows a device such as a network adaptor (e.g., NIC) to separate access to its resources among various PCIe hardware functions. The PCIe hardware functions include a PCIe Physical Function (PF) and one or more PCIe Virtual Functions (VFs). The PF is the primary function of the device and advertises the device's SR-IOV capabilities. The PF is associated with the Hyper-V parent partition in a virtualized environment. Each VF is associated with the PF. A VF shares one or more physical resources of the device, such as a memory (e.g., memory 116) and a network port, with the PF and other VFs on the device. Each VF is associated with a Hyper-V child partition in a virtualized environment. Each PF and VF is assigned a unique PCI Express Requester ID (RID) that allows an I/O memory management unit (IOMMU) to differentiate between different traffic streams and apply memory and interrupt translations between the PF and VFs. This allows traffic streams to be delivered directly to the appropriate Hyper-V parent or child partition. As a result, non-privileged data traffic flows from the PF to VF without affecting other VFs. SR-IOV enables network traffic to bypass the software switch layer of the Hyper-V virtualization stack. Because the VF is assigned to a child partition, the network traffic flows directly between the VF and child partition. As a result, the I/O overhead in the software emulation layer is diminished and achieves network performance that is nearly the same performance as in non-virtualized environments.

Figure 2:
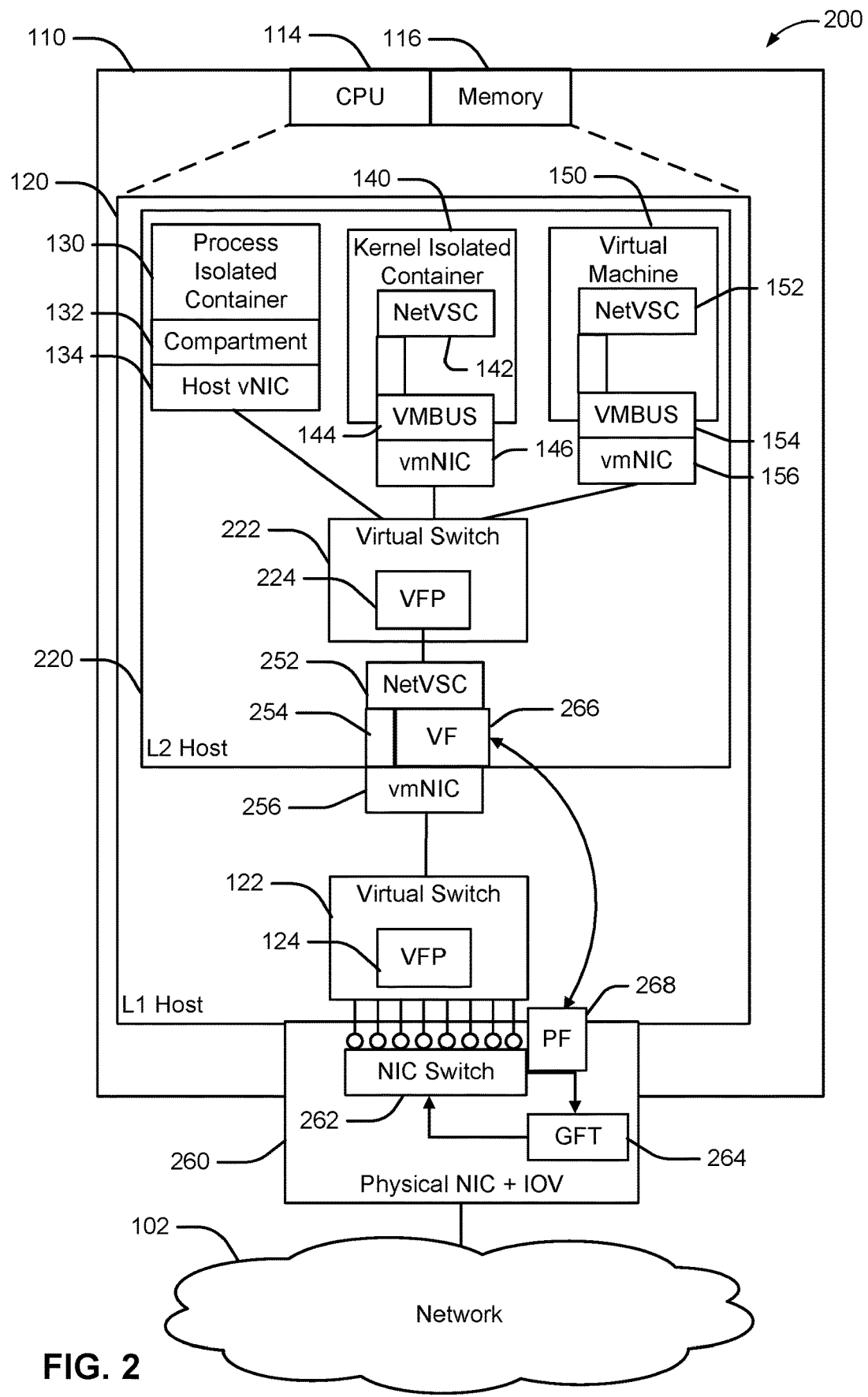
FIG. 2 is a schematic diagram of an example network architecture including containers nested within a virtual machine.

Referring to FIG. 2 an example multi-level host architecture 200 includes a layer 1 host 120 executed on a physical host 110 and a layer 2 host 220, which is a virtual machine on the layer 1 host 120. As a virtual machine, the layer 2 host 220 includes a virtual machine NIC 256, vmBUS 254, and netVSC device 252. For supporting containers, the layer 2 host 220 also includes a virtual switch 222 and a VFP 224. The multi-level host architecture 200 preserves a formally correct OSI Layer 2 network topology. The L1 Host 120 is analogous to an Aggregation Layer Switch. The L2 Host 220 is equivalent to a Top of Rack Switch (TOR). Lastly, a container is the endpoint, which is equivalent to a physical machine in a rack. The virtual switches 122, 222 effectively provide media access to the virtual and physical fabric for the container endpoints. This approach aids in compatibility, stability, diagnosis, and support. While many non-standard combinations are possible for performance reasons, correctness is a desirable quality to preserve a maintainable and extensible architecture with manageable test/validation costs.

The guest datapath on the multi-level host architecture 200 is augmented with SR-IOV including a PF 268 and VFs 266. For example, a physical NIC 260 implements SR-IOV. The physical NIC 260 includes a NIC switch 262 that distributes network traffic to VFs 266. For example, a VF 266 is assigned to the L2 host 220. The physical NIC 260 identifies traffic for the VF 266 and route/copy data packets for the VF 266 directly to a memory assigned to the VF 266. Accordingly, the VF 266 allows traffic for the L2 host 220 to bypass the virtual switch 122.

However, since VFs bypass host mediated IO (e.g., the VFP 224 in the virtual switch 222), the host policies and ACLs will not apply for VF traffic. To secure VF traffic, the policies, rates, and resource caps are enforced through hardware mechanisms, which are implemented in the physical NIC 260 that includes IOV functionality.

The physical NIC 260 performs firewalling and control what is placed on a fabric (e.g., NIC switch 262) via Generic Flow Tables (GFT) 264. The GFT 264 allows VFP 124 in virtual switch 122 to offload Policies/ACLs to the physical NIC 260 for controlling what the VF places on the fabric. The physical NIC 260 performs rate limiting of how much traffic is placed on the fabric. The NIC switch 262 performs hardware quality of service (QoS) that enables the ability to rate-limit traffic via send caps or reservation and receive caps on a per IEEE 802.1p, IP differentiated services code point (DSCP). Additionally, a Guest data center bridging (DCB) feature allows for last hop IEEE 802.1p and IP DSCP priority sanitization, as well as classification per stateful offloads such as remote direct memory access (RDMA). The classification is extensible to Internet Small Computer Systems Interface (iSCSI), Fibre Channel over Ethernet (FCoE), and similar stateful offloads. The physical NIC 260 enforces per tenant resource caps. Resource management encompasses host side control of how many physical NIC resources each VF is allowed to consume. Thus preventing noisy neighbor scenarios where a misbehaving VF drains all injectors or queueing points (QPs) or similar resources from the physical NIC 260, leaving other virtual machines unable to use NIC accelerations.

The architecture 200 improves latency to the L2 host 220, but may be unable to provide hardware level access to the containers (e.g., process isolated container 130, kernel isolated container 140, or virtual machine 150). Due to the nested architecture, network traffic between the VF 266 and the containers still passes through the virtual switch 222 of the L2 host 220. More specifically, since the kernel isolated container 144 and the virtual machine 150 are isolated by the kernel or hypervisor, these containers could not access a VF 266 even if a VF 266 were assigned to the specific container.

Figure 3:
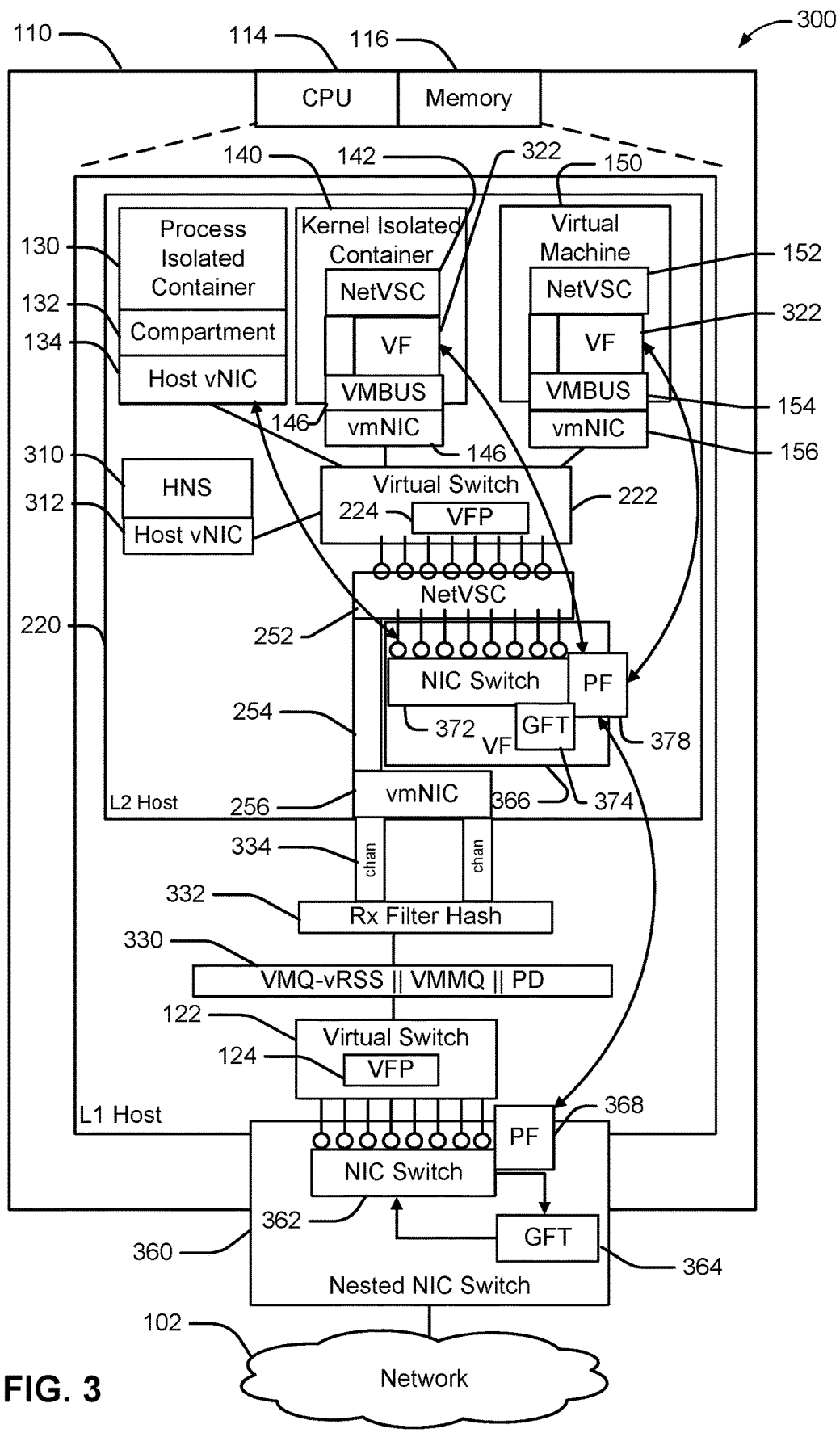
FIG. 3 is a schematic diagram of an example network architecture including kernel isolated containers nested within a virtual machine and assigned a virtual function for hardware access, in accordance with an implementation of the present disclosure.

Referring to FIG. 3 an example multi-level host architecture 300 includes a layer 1 host 120 executed on a physical host 110 and a layer 2 host 220, which is a virtual machine on the layer 1 host 120. The multi-level host architecture 300 includes multiple containers, including process isolated containers 130, kernel isolated containers 140, and virtual machines 150. The multi-level host architecture 300 provides the containers with hardware level access using a nested NIC Switch 360.

The nested NIC switch 360 is a physical NIC including two layers of NIC switches, NIC switch 362 and NIC switch 372. As such the nested NIC switch 360 is considered a middlebox device. Each NIC switch implements SR-IOV and includes a physical function and multiple virtual functions. For example, the NIC switch 362 includes the physical function 368 and the virtual function 366. Additional virtual functions of the NIC switch 362 are associated with additional L2 hosts (not shown). The NIC switch 262 is configured by the GFT 364 to route traffic according to policies and ACLs. The NIC switch 372 is associated with one of the virtual functions 366 of the NIC switch 362. Although illustrated within the L2 host 220, the NIC switch 362 is a physical switch within the nested NIC switch 360. That is, the NIC switch 362 routes data packets for the L2 host 220 to the virtual function 366 that is associated with the NIC switch 372 at a hardware level. The NIC switch 372 includes a physical function 378 and multiple virtual functions 322. The virtual functions 322 are assigned to the containers, specifically the kernel isolated containers 140. Accordingly, the NIC switch 372 routes data packets for the virtual functions 322 at the hardware level.

The synthetic datapath can be augmented with changes to the virtual switch 122 of L1 host 120 to steer ingress traffic to synthetic vPorts associated with vmBUS channels 334. Using virtual machine queues (VMQ) 330 with virtual receive side scaling (vRSS) or virtual machine multi-queues (VMMQ), the virtual switch 122 redirects which L2 Host CPUs are used as indicated by L2 Guest preferences. This entails exchanging the receive side scaling (RSS) indirection table preferences from L2 Guests through L2 Host virtual switch 222 and into its pNIC (i.e., NIC switch 372) by the NetVSC device 252. The NetVSC device 252 will propagate the indirection information to the L1 Host 120 such that receptions are redirected to the right VMBus channels 334 to mimic Synthetic vPorts in the L2 Host 220. The synthetic NicSwitch capability enables adding the physical NicSwitch capable virtual function 366 with hardware based vPort capabilities.

Additionally, the host network services (HNS) 310 manages the virtual switch 222, process isolated containers 130, kernel isolated containers 140, and virtual machines 150 based on requests from the containers via a virtual NIC 312. The requests are within the L2 Host space. The NetVSC device 252 exposes an interface for Nested GFT, Nested HWQoS, and similar features to secure the L2 Guests VF traffic. The L1 Host 120 includes drivers to support Nested GFT and Nested HWQoS management in the nested NIC switch 360 and to support (e.g., advertise) the physical functions 368, 378.

A process isolated container 130 can also leverage pseudo-direct HW access by bypassing the vSwitch and connecting directly to the vPorts on the NIC switch 372.

Figure 4:
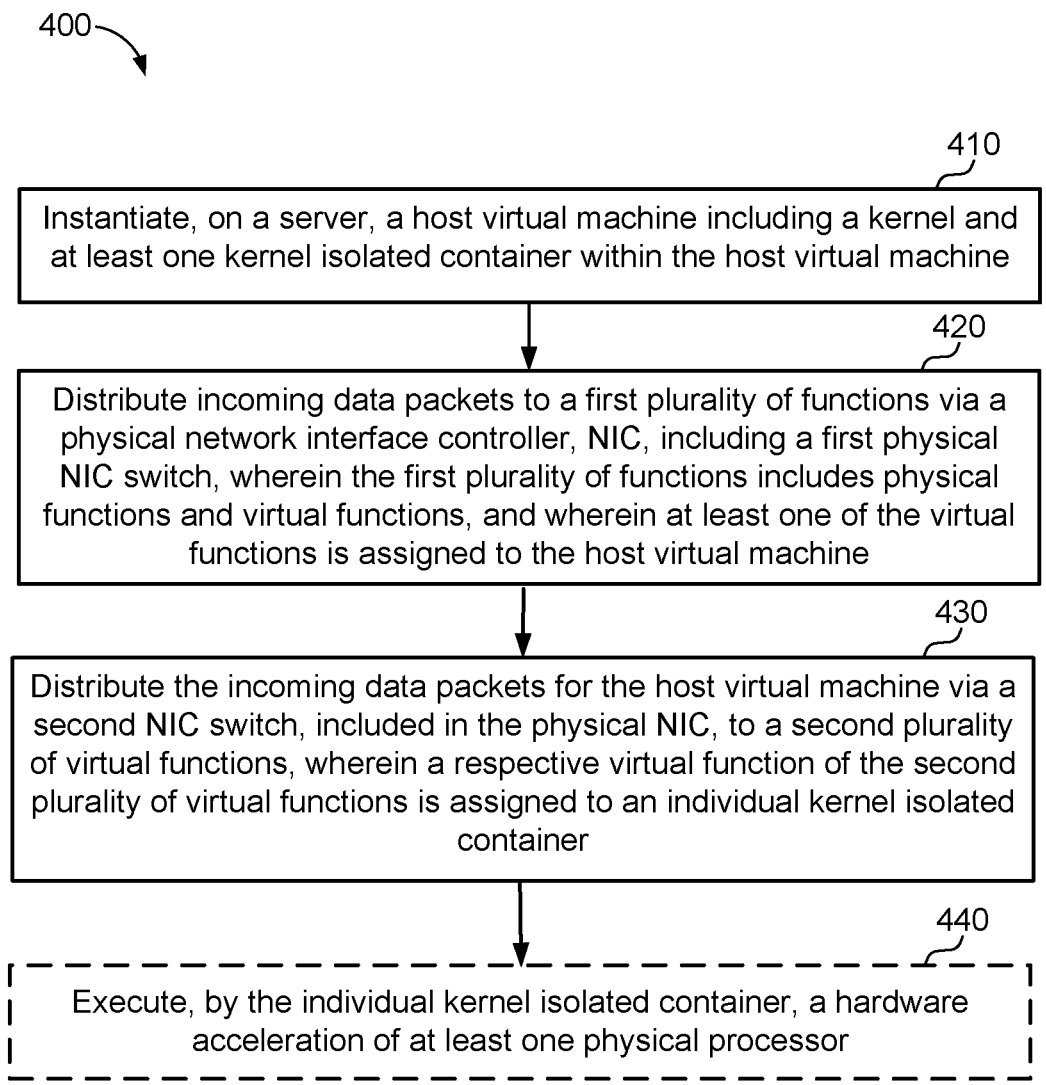
FIG. 4 is a flowchart of an example method of hosting process isolated containers, in accordance with an implementation of the present disclosure.

Turning to FIG. 4, an example method 400 hosts kernel isolated containers within a virtual machine. For example, method 400 can be performed by the host architecture 300 on the physical host 110.

At block 410, the method 400 includes instantiating, on a server, a host virtual machine including a kernel and at least one kernel isolated container within the host virtual machine. For example, in an implementation, the host architecture 300 or L1 host 120 instantiates, on a server (e.g., physical host 110) including a processor 114, a host virtual machine (e.g., L2 host 220) and at least one kernel isolated container 140 (or virtual machine 150) within the L2 host 220. For instance, the L1 host 120 loads the code defining the L2 host 220 into memory 116 and executes the code. The L2 host 220 similarly loads the code defining each kernel isolated container into the virtual memory of the virtual machine for execution on a virtual processor. Accordingly, the host virtual machine and each kernel isolated container is resident in the memory 116 or in virtual memory.

At block 420, the method 400 includes distributing incoming data packets to a first plurality of functions via a physical network interface controller, NIC, including a first physical NIC switch, wherein the first plurality of functions includes a physical function and virtual functions, and wherein at least one of the virtual functions is assigned to the host virtual machine. In an implementation, for example, the nested NIC switch 360 including the physical NIC switch 362 distributes incoming data packets (e.g., from network 102) to a first plurality of functions including physical function 368 and virtual functions 366. At least one of the virtual functions 366 is assigned to the L2 host 220. The physical NIC switch 362 uses the GFT 364 to route each packet to the correct virtual function 366. For example, the NIC switch 362 compares an address (e.g., IP address or MAC address) of the packet to the GFT 364 to determine the correct virtual function 366. The NIC switch 262 stores the packet in a memory associated with the correct virtual function 366.

At block 430, the method 400 includes distributing the incoming data packets for the host virtual machine via a second NIC switch, included in the physical NIC, to a second plurality of virtual functions, wherein a respective virtual function of the second plurality of virtual functions is assigned to an individual kernel isolated container. In an implementation, for example, the NIC switch 372, included in the nested NIC switch 360, distributes the incoming data packets for the L2 host 220 to a second plurality of virtual functions (e.g., virtual functions 322). A respective virtual function 322 is assigned to an individual kernel isolated container 140. The physical NIC switch 372 operates in a similar manner to the physical NIC switch 362. That is, the physical NIC switch 372 uses the GFT 374 to route each packet to the correct virtual function 322. For example, the NIC switch 372 compares an address (e.g., an IP address or MAC address) of the packet to the GFT 374 to determine the correct virtual function 322. The NIC switch 372 stores the packet in a memory associated with the correct virtual function 322.

At block 440, the method 400 optionally includes executing, by the individual kernel isolated container, a hardware acceleration of at least one physical processor. In an aspect, for example, the individual kernel isolated container 140 executes the hardware acceleration of the processor 114 or a direct memory access operation on the memory 116. The kernel isolated container 140 accesses the processor 114 or the memory 116 via the virtual function 322. The hardware acceleration can be one of a remote direct memory access or a data plane development kit operation. For example, a remote direct memory access operation allows copying of application data directly between memory 116 and the network 102 (e.g., as TCPIP packets).

Figure 5:
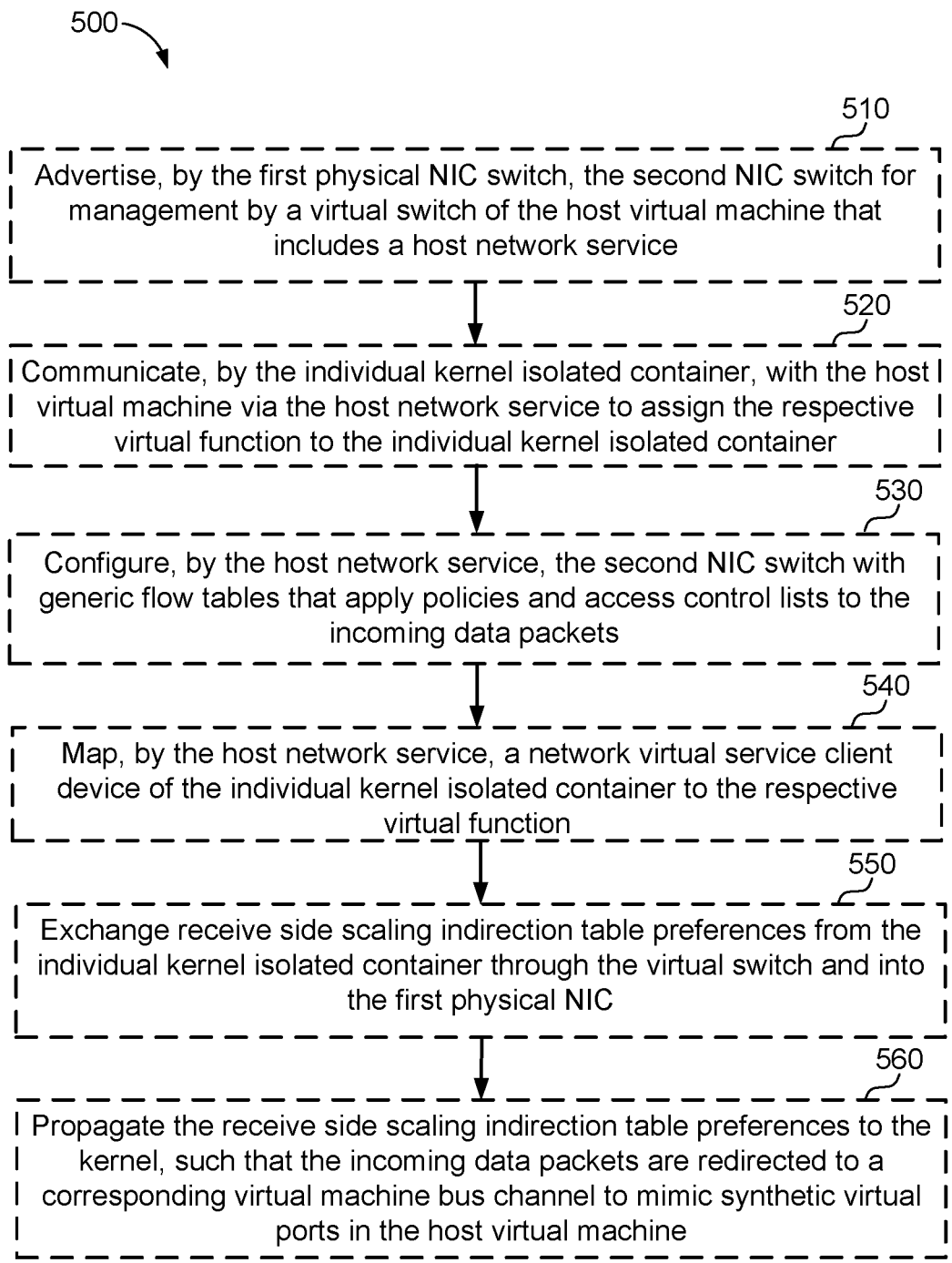
FIG. 5 is a flowchart of an example method of configuring a server for hosting process isolated containers, in accordance with an implementation of the present disclosure.

Turning to FIG. 5 an example method 500 configures a server with kernel isolated containers within a virtual machine for hardware level access. For example, method 500 can be performed by the host architecture 300 on the physical host 110. The method 500 is optionally performed in response to block 410 of the method 400.

At block 510, the method 500 includes advertising, by the first physical NIC switch, the second NIC switch for management by a virtual switch of the host virtual machine that includes a host network service. In an implementation, for example, the first physical NIC switch 362 advertised the second NIC switch 372 for management by the virtual switch 222 of the L2 host 210 that includes the HNS 310 having a host virtual NIC 312 connected to the virtual switch 222. For instance, the first physical NIC switch 362 advertised the second physical NIC switch 372 during initialization of NIC 360.

At block 520, the method 500 included communicating, by the individual kernel isolated container, with the host virtual machine via the host network service to assign the respective virtual function to the individual kernel isolated container. For instance, the individual kernel isolated container 140 communicates with the L2 host 210 via the HNS 310 to assign the respective virtual function 322 to the individual kernel isolated container 140. In an implementation, the HNS assigns the respective virtual function 322 to the vmNIC 146/156.

At block 530, the method 500 includes configuring, by the host network service, the second NIC switch with generic flow tables that apply policies and access control lists to the incoming data packets. For instance, the HNS 310 configures the second NIC switch 372 with GFT 374 that applies policies and access control lists to the incoming data packets (e.g., from network 102). The HNS 310 generates the GFT 374 based on policies configured in the VFP 224.

At block 540, the method 500 includes mapping, by the host network service, a network virtual service client device of the individual kernel isolated container to the respective virtual function. In an implementation, for example, the HNS 310 maps the netVSC device 142 of the individual kernel isolated container 140 to the respective virtual function 322. In response to receiving the request from the individual kernel isolated container, the HNS 310 instantiates the NetVSC 142 and assigns the NetVSC 142 to the VF 322.

At block 550, the method 500 includes exchanging receive side scaling indirection table preferences from the individual kernel isolated container through the virtual switch and into the first physical NIC. In an aspect, for example, the individual kernel isolated container 140 exchanges receive side scaling (RSS) indirection table preferences through the virtual switch 222 and into the first physical NIC switch 362.

At block 560, the method 500 includes propagating the receive side scaling indirection table preferences to the kernel, such that the incoming data packets are redirected to a corresponding VMBus channel 334 to mimic synthetic virtual ports in the host virtual machine. For instance, the first physical NIC switch 362 propagates the RSS indirection table preferences through the virtual switch 122, VMQ-vRSS 330, Rx Filter Hash 332, and VMBus channels 334 to the kernel, such that the incoming data packets are redirected to a corresponding virtual machine bus channel 334 to mimic synthetic virtual ports in the L2 host 220. For instance, the Rx Filter Hash 332 performs a hash on an incoming packet so that the resulting hash ID maps to a VMBus channel 334.

Figure 6:
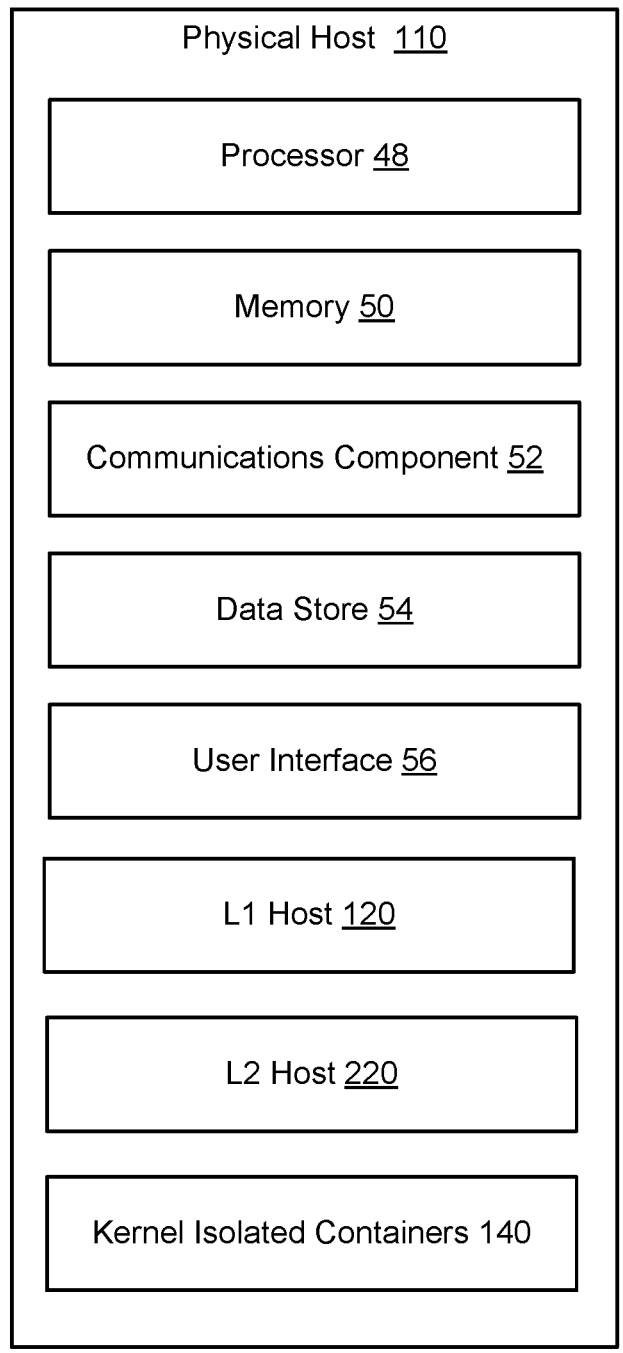
FIG. 6 is a schematic block diagram of an example computer device, in accordance with an implementation of the present disclosure.

Referring now to FIG. 6, illustrated is an example physical host 110 in accordance with an implementation, including additional component details as compared to FIG. 1. In one example, physical host 110 includes processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 includes the physical processor 114.

In an example, physical host 110 includes memory 50 for storing instructions executable by the processor 48 for carrying out the functions described herein. In an implementation, for example, memory 50 includes memory 116. The memory 50 includes instructions for executing the L1 host 120, L2 host 220, and any containers within the L2 host 220.

Further, physical host 110 includes a communications component 52 that provides for establishing and maintaining communications with one or more parties utilizing hardware, software, and services as described herein. Communications component 52 carries communications between components on physical host 110, as well as between physical host 110 and external devices, such as devices located across a communications network and/or devices serially or locally connected to physical host 110. For example, communications component 52 includes one or more buses, and can further include transmit chain components and receive chain components associated with a transmitter and receiver, respectively, operable for interfacing with external devices.

Additionally, physical host 110 includes a data store 54, which can be any suitable combination of hardware and/or software, that provides for mass storage of information, databases, and programs employed in connection with implementations described herein. For example, data store 54 is a data repository for L1 host 120, L2 host 220, and/or containers. The data store includes memory 116 and/or a storage device.

Physical host 110 also includes a user interface component 56 operable to receive inputs from a user of physical host 110 and further operable to generate outputs for presentation to the user. User interface component 56 includes one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 includes one or more output devices, including but not limited to a display, a speaker, a haptic feedback mechanism, a printer, any other mechanism capable of presenting an output to a user, or any combination thereof.

In an implementation, user interface component 56 transmits and/or receives messages corresponding to the operation of L1 host 120, L2 host 220, and/or containers. In addition, processor 48 executes L1 host 120, L2 host 220, and/or containers, and memory 50 or data store 54 store them.

As used in this application, the terms "component," "system" and the like are intended to include a computer-related entity, such as but not limited to hardware, firmware, a combination of hardware and software, software, or software in execution. For example, a component includes, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component can be localized on one computer and/or distributed between two or more computers. In addition, these components can execute from various computer readable media having various data structures stored thereon. The components communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features have been presented in terms of systems that include a number of devices, components, modules, and the like. A person skilled in the art should understand and appreciate that the various systems can include additional devices, components, modules, etc. and/or may not include all of the devices, components, modules etc. discussed in connection with the figures. A combination of these approaches can also be used.

The various illustrative logics, logical blocks, and actions of methods described in connection with the embodiments disclosed herein can be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor includes a microprocessor, but, in the alternative, the processor can be any conventional processor, controller, microcontroller, or state machine. A processor can also be implemented as a combination of computer devices, e.g., a combination of a DSP and a microprocessor, a plurality of microprocessors, one or more microprocessors in conjunction with a DSP core, or any other such configuration. Additionally, at least one processor comprises one or more components operable to perform one or more of the steps and/or actions described above.

Further, the steps and/or actions of a method or procedure described in connection with the implementations disclosed herein can be embodied directly in hardware, in a software module executed by a processor, or in a combination of the two. A software module resides in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium is integral to the processor. Further, in some implementations, the processor and the storage medium reside in an ASIC. Additionally, the ASIC resides in a user terminal. In the alternative, the processor and the storage medium reside as discrete components in a user terminal. Additionally, in some implementations, the steps and/or actions of a method or procedure reside as one or any combination or set of codes and/or instructions on a machine readable medium and/or computer readable medium, which can be incorporated into a computer program product.

In one or more implementations, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium includes any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above can be made without departing from the scope hereof. Other implementations will be apparent to those skilled in the art from a consideration of the specification or from a practice in accordance with examples disclosed herein.

Some Further Example Implementations

An example server for hosting kernel isolated containers within a virtual machine, comprising: at least one physical processor; at least one physical computer memory storing executable code for execution by the at least one physical processor, the executable code providing a host virtual machine including a kernel and at least one kernel isolated container within the host virtual machine; a physical network interface controller, NIC, including a first physical NIC switch configured to distribute incoming data packets to a first plurality of functions, wherein the first plurality of functions includes a physical function and virtual functions, at least one of the virtual functions assigned to the host virtual machine, the physical NIC further includes a second physical NIC switch configured to distribute the incoming data packets for the host virtual machine to a second plurality of virtual functions, wherein a respective virtual function of the second plurality of virtual functions is assigned to an individual kernel isolated container of the at least one kernel isolated container within the host virtual machine. Accordingly, the example server routes packets to a kernel isolated container nested within a virtual machine at a hardware level, which increases the speed and decreases latency in comparison to software routing.

The above example server, wherein the respective virtual function for the individual kernel isolated container is configured to access a portion of the at least one physical computer memory allocated to the individual kernel isolated container to bypass a virtual switch of the host virtual machine. By bypassing the virtual switch, the server eliminates latency associated with the virtual switch and reduce processor cycles consumed by the virtual switch.

Any of the above example servers, wherein the first physical NIC switch is configured to advertise the physical function of the second physical NIC switch for management by a virtual switch of the host virtual machine that includes a host network service. Accordingly, the virtual machine and/or the kernel isolated container is informed that the second physical NIC switch is available for hardware level access for the kernel isolated container.

The above example server, wherein the individual kernel isolated container is configured to communicate with the host virtual machine via the host network service to assign the respective virtual function to the at least one kernel isolated container. Accordingly, the kernel isolated container is configured for hardware level access.

The above example server, wherein the host network service is configured to configure the second physical NIC switch with generic flow tables that apply policies and access control lists to the incoming data packets. Accordingly, isolation of the kernel isolated container is enforced and the communications to the kernel isolated container is secured.

The above example server, wherein the host network service is configured to map a network virtual service client device of the individual kernel isolated container to the respective virtual function. Accordingly, the virtual service client device provides the kernel isolated container with a view of the virtual function and second NIC switch.

The above example server, wherein the network virtual service client device is configured to: exchange receive side scaling indirection table preferences from the at least one kernel isolated container through the virtual switch and into the second physical NIC switch; and propagate the receive side scaling indirection table preferences to a physical host, such that the incoming data packets are redirected to a corresponding virtual machine bus channel to mimic synthetic virtual ports in the host virtual machine. Accordingly, the server maintains correct network topology for analysis and trouble shooting.

Any of the above example servers, wherein the at least one kernel isolated container is configured to execute a hardware acceleration of the at least one physical processor. By receiving access to a hardware acceleration via the virtual function, the kernel isolated container further increases the speed of specific tasks for which hardware accelerations are available.

An example method of hosting kernel isolated containers within a virtual machine, comprising: instantiating, on a server, a host virtual machine including a kernel and at least one kernel isolated container within the host virtual machine; distributing incoming data packets to a first plurality of functions via a physical network interface controller, NIC, including a first physical NIC switch, wherein the first plurality of functions includes a physical function and virtual functions, and wherein at least one of the virtual functions is assigned to the host virtual machine; and distributing the incoming data packets for the host virtual machine via a second physical NIC switch included in the physical NIC, to a second plurality of virtual functions, wherein a respective virtual function of the second plurality of virtual functions is assigned to an individual kernel isolated container. Accordingly, the server routes packets to a kernel isolated container nested within a virtual machine at a hardware level, which increases the speed and decreases latency in comparison to software routing.

The above example method, further comprising advertising, by the first physical NIC switch, the second physical NIC switch for management by a virtual switch of the host virtual machine that includes a host network service. Accordingly, the virtual machine and/or the kernel isolated container is informed that the second physical NIC switch is available for hardware level access for the kernel isolated container.

Any of the above example methods, further comprising communicating, by the individual kernel isolated container, with the host virtual machine via the host network service to assign the respective virtual function to the individual kernel isolated container. Accordingly, the kernel isolated container is configured for hardware level access.

Any of the above example methods, further comprising configuring, by the host network service, the second physical NIC switch with generic flow tables that apply policies and access control lists to the incoming data packets. Accordingly, isolation of the kernel isolated container is enforced and the communications to the kernel isolated container are secured. Accordingly, the virtual service client device provides the kernel isolated container with a view of the virtual function and second NIC switch.

Any of the above example methods, further comprising: mapping, by the host network service, a network virtual service client device of the individual kernel isolated container to the respective virtual function; exchanging receive side scaling indirection table preferences from the individual kernel isolated container through the virtual switch and into the second physical NIC switch; and propagating the receive side scaling indirection table preferences to a physical host, such that the incoming data packets are redirected to a corresponding virtual machine bus channel to mimic synthetic virtual ports in the host virtual machine. Accordingly, the server maintains correct network topology for analysis and trouble shooting.

Any of the above example methods, further comprising executing, by the individual kernel isolated container, a hardware acceleration of at least one physical processor, wherein the hardware acceleration is one of a remote direct memory access or a data plane development kit operation. By receiving access to a hardware acceleration via the virtual function, the kernel isolated container further increases the speed of specific tasks for which hardware accelerations are available.

An example non-transitory computer-readable medium storing computer executable instructions for performing any of the above example methods.

What is claimed is:

1. A system for hosting kernel isolated containers within a virtual machine, comprising:
   at least one physical processor;
   at least one physical computer memory storing code for execution by the at least one physical processor, the code providing a host virtual machine including a kernel and at least one kernel isolated container within the host virtual machine; and a physical network interface controller (NIC) including:
- a first physical NIC switch configured to distribute data packets to at least one physical function and at least one first virtual function assigned to the host virtual machine; and
- a second physical NIC switch configured to:
  - receive at least a portion of the data packets distributed, via the first physical NIC switch, to the at least one first virtual function assigned to the host virtual machine; and
  - distribute the at least the portion of the data packets to at least one second virtual function assigned to the at least one kernel isolated container within the host virtual machine, the receiving and the distributing the at least the portion of the data packets thereby reducing an amount of resources of the at least one physical processor useable by a virtual switch.

2. The system of claim 1, wherein the at least one second virtual function assigned to the at least one kernel isolated container is configured to access a portion of the at least one physical computer memory allocated to the at least one kernel isolated container to bypass the virtual switch.

3. The system of claim 1, wherein:
the first physical NIC switch is configured to advertise the second physical NIC switch for management by the virtual switch; and
the virtual switch includes a host network service.

4. The system of claim 3, wherein the at least one kernel isolated container is configured to communicate with the host virtual machine via the host network service to assign the at least one second virtual function to the at least one kernel isolated container.

5. The system of claim 3, wherein the host network service is configured to configure the second physical NIC switch with generic flow tables that apply policies and access control lists to the at least the portion of the data packets.

6. The system of claim 3, wherein the host network service is configured to map a network virtual service client device of the at least one kernel isolated container to the at least one second virtual function.

7. The system of claim 6, wherein the network virtual service client device is configured to:
exchange receive side scaling indirection table preferences from the at least one kernel isolated container through the virtual switch and into the second physical NIC switch; and
propagate the receive side scaling indirection table preferences to a physical host, such that the at least the portion of the data packets are redirected to a corresponding virtual machine bus channel to mimic synthetic virtual ports in the host virtual machine.

8. The system of claim 1, wherein the at least one kernel isolated container is configured to execute a hardware acceleration of the at least one physical processor.

9. The system of claim 1, wherein:
the at least one physical function includes a peripheral component interconnect express (PCIe) physical function; and
the at least one first virtual function includes a single root input-output virtual (SR-IOV) function.

10. A method of hosting kernel isolated containers within a host virtual machine, comprising:
instantiating, on a server, the host virtual machine including a kernel and at least one a kernel isolated container within the host virtual machine;
distributing, via a first physical network interface controller (NIC) switch included in a physical NIC controller, data packets to a plurality of functions, wherein:
the physical NIC controller includes a second physical NIC switch;
the first physical NIC switch is configured at a first layer;
the second physical NIC switch is configured at a second layer nested within the first layer;
the plurality of functions includes a physical function and a first virtual function assigned to the host virtual machine; and
the second physical NIC switch is configured to receive at least a portion of the data packets distributed, via the first physical NIC switch, to the first virtual function assigned to the host virtual machine; and
distributing the at least the portion of the data packets via the second physical NIC switch to a second virtual function assigned to the kernel isolated container within the host virtual machine, thereby reducing an amount of resources of at least one physical processor useable by a virtual switch.

11. The method of claim 10, further comprising advertising, by the first physical NIC switch, the second physical NIC switch for management by the virtual switch, wherein the virtual switch includes a host network service.

12. The method of claim 11, further comprising communicating, by the kernel isolated container, with the host virtual machine via the host network service to assign the second virtual function to the kernel isolated container.

13. The method of claim 11, further comprising configuring, by the host network service, the second physical NIC switch with generic flow tables that apply policies and access control lists to the at least the portion of the data packets.

14. The method of claim 11, further comprising:
mapping, by the host network service, a network virtual service client device of the kernel isolated container to the second virtual function;
exchanging receive side scaling indirection table preferences from the kernel isolated container through the virtual switch and into the second physical NIC switch; and
propagating the receive side scaling indirection table preferences to a physical host, such that the at least the portion of the data packets are redirected to a corresponding virtual machine bus channel to mimic synthetic virtual ports in the host virtual machine.

15. The method of claim 10, further comprising executing, by the kernel isolated container, a hardware acceleration of the at least one physical processor, wherein the hardware acceleration is one of a remote direct memory access or a data plane development kit operation.

16. The method of claim 10, wherein:
the physical function includes a peripheral component interconnect express (PCIe) physical function; and
the first virtual function includes a single root input-output virtual (SR-IOV) function.

17. A non-transitory computer-readable medium storing computer executable instructions, that when executed by a processor of a server cause the server to:
instantiate, on the server, a host virtual machine including a kernel and a kernel isolated container within the host virtual machine;
distribute, via a first physical network interface controller (NIC) switch included in a physical NIC controller, data packets to a plurality of functions, wherein:

the physical NIC controller includes a second physical NIC switch;

the first physical NIC switch is configured at a first layer;

the second physical NIC switch is configured at a second layer nested within the first layer;

the plurality of functions includes a physical function and a first virtual function assigned to the host virtual machine; and the second physical NIC switch is configured to receive at least a portion of the data packets distributed, via the first physical NIC switch, to the first virtual function assigned to the host virtual machine; and distribute the at least the portion of the data packets via the second physical NIC switch to a second virtual function assigned to the kernel isolated container within the host virtual machine, thereby reducing an amount of resources of the processor useable by a virtual switch.

18. The non-transitory computer-readable medium of claim 17, wherein the computer executable instructions further cause the server to:

advertise, by the first physical NIC switch, the second physical NIC switch for management by the virtual switch, wherein the virtual switch includes a host network service; and communicate, by the kernel isolated container, with the host virtual machine via the host network service to assign the second virtual function to the kernel isolated container.

19. The non-transitory computer-readable medium of claim 17, wherein the computer executable instructions further cause the server to execute, by the kernel isolated container, a hardware acceleration of the processor, wherein the hardware acceleration is one of a remote direct memory access or a data plane development kit operation.

20. The non-transitory computer-readable medium of claim 17, wherein:

the physical function includes a peripheral component interconnect express (PCIe) physical function; and the first virtual function includes a single root input-output virtual (SR-IOV) function.

* * * * *